United States Patent [19]

Best et al.

[11] Patent Number: 5,785,541
[45] Date of Patent: Jul. 28, 1998

[54] CLOCKSPRING TAMPER PREVENTION AND DETECTION SEAL AND METHOD

[75] Inventors: Gary R. Best, Hamilton; Patrick A. Bolen, Carthage, both of Ill.

[73] Assignee: Methode Electronics, Inc., Chicago, Ill.

[21] Appl. No.: 594,697

[22] Filed: Jan. 31, 1996

[51] Int. Cl.$^6$ ..................................................... H01R 3/00
[52] U.S. Cl. .................................................. 439/164; 439/15
[58] Field of Search ...................... 439/164, 16, 15; 428/40

[56] References Cited

U.S. PATENT DOCUMENTS

| | | | |
|---|---|---|---|
| 4,327,147 | 4/1982 | Ou-Yang | 156/69 |
| 4,503,123 | 3/1985 | Ou-Yang | 428/349 |
| 4,652,473 | 3/1987 | Han | 428/35 |
| 4,666,052 | 5/1987 | Ou-Yang | 215/230 |
| 4,722,690 | 2/1988 | Priede | 439/15 |
| 5,111,953 | 5/1992 | Faust et al. | 220/214 |
| 5,137,463 | 8/1992 | Sasaki et al. | 439/164 |
| 5,153,042 | 10/1992 | Indrelie | 428/40 |
| 5,171,157 | 12/1992 | Bolen | 439/164 |

OTHER PUBLICATIONS

Minnesota Mining and Manufacturing Company; "Technical Report: Tamper–Indicating Non–Marking Label Stock: Product No. 7394"; Aug. 31, 1994, pp. 1–4.

*Primary Examiner*—Khiem Nguyen
*Assistant Examiner*—Eugene G. Byrd
*Attorney, Agent, or Firm*—David L. Newman

[57] ABSTRACT

A seal is provided for indicating whether a clockspring has been tampered with. The clockspring consists of a housing, a hub rotatably mounted to the housing, and a ribbon cable connected to the housing and the hub. The seal is attached to the clockspring housing and hub. The seal may consist of a tamper indicating non-marking label stock having a facestock, flexographically printed indicia located on the facestock, and an adhesive coated over the flexographically printed indicia. Furthermore, the flexographically printed indicia may provide a message such as the word "VOID." Finally, the seal may include printed instructions for inspecting the seal.

12 Claims, 7 Drawing Sheets

CLOCKSPRING TAMPER PREVENTION AND DETECTION SEAL AND METHOD

BACKGROUND OF THE INVENTION

The present invention relates to a clockspring which electrically connects a stationary housing to a rotatable hub via a flat ribbon cable, and in particular to a tamper prevention and detection seal and method for ensuring that the clockspring is properly centered during installation.

Clocksprings are typically used in applications such as connecting an air bag, mounted in the steering wheel of an automobile, to sensors mounted within various locations of the automobile.

For example, U.S. Pat. No. 4,722,690 (1988), issued to Priede, discloses a type of clockspring which provides a direct electrical connection between relatively movable members in the steering apparatus of an automobile. In this type of clockspring construction, a ribbon cable is used to provide the electrical connection. The ribbon cable is constructed of conductive material which is sandwiched between two layers of mylar. The cable is loosely accommodated in a coiled state within the clockspring's housing. In addition, one end of the cable is attached to the clockspring's stationary member and the other end of the cable is attached to the clockspring's rotatable hub.

In operation, the ribbon cable will either wrap or unwrap around the hub as the hub is rotated. However, in order to prevent the cable from being damaged during rotation of the hub, no substantial tensile force may be applied to the ribbon cable while it is wrapping or unwrapping. An overwound condition is said to occur when the hub is rotated so far in one direction that a significant amount of tensile force is applied to the cable.

In order to prevent excess tensile force from being applied to the cable, it is necessary to center the hub when it is installed on the steering apparatus. Centering of the hub allows for the same extent of clockwise and counterclockwise rotation of the hub before the ribbon cable becomes overwound.

If the hub is not in the centered position when the clockspring is installed on the steering apparatus, then the cable will be damaged when it is completely wrapped and/or unwrapped around the hub, but yet the steering apparatus is still allowed to turn.

To ensure that the clockspring is centered when it is installed on the steering apparatus, external locking mechanisms are sometimes used such as a pin or key member. These locks prevent rotational travel of the hub prior to the clockspring's installation. The external lock is disengaged by simply removing it from the clockspring and discarding it.

Likewise, internal locking mechanism are also used in order to prevent rotation of the hub such as, for example, U.S. Pat. No. 5,171,157 (1992), issued to Bolen and incorporated herein by reference. The internal lock limits the travel of the hub whenever the clockspring is not installed on the steering apparatus. The internal lock is usually disengaged by a pin or other unlocking system provided by the steering apparatus. Furthermore, the lock will reengage whenever the clockspring is removed from the steering apparatus.

Although the prior art locking systems are effective in preventing movement of the hub with relation to the clockspring housing, if the locks are accidently or intentionally disengaged before the clockspring is installed on the steering apparatus, then there will be no way to ensure and/or indicate that the clockspring has been tampered with and thus the clockspring may not be properly centered. For example, an external lock can be disengaged, the hub can be rotated so that the clockspring is not centered, and then the external lock can then be reengaged. Furthermore, the prior art locking devices are costly and cause a substantial increase in the size of the overall clockspring structure.

Therefore, both a device and a method are proposed which clearly indicates whether a clockspring has been tampered with. Furthermore, the device and method prevents the hub from rotating until the clockspring is ready for installation.

In view of the above, it is an object of the present invention to reliably indicate if a clockspring has been tampered with prior to installation on a steering apparatus.

A further object of the present invention is to prevent the hub of a clockspring from rotating prior to installation on a steering apparatus.

An added object of the present invention is to provide a low cost method of determining if a clockspring has been tampered with prior to installation on a steering apparatus.

Another object of the present invention is to provide a low cost method of preventing the hub of a clockspring from rotating prior to installation on a steering apparatus.

In addition, it is an object of the present invention to eliminate the possibility of the occurrence of an overwound condition due to improper installation of a clockspring on a steering apparatus.

Furthermore, other objects, features, and advantages of the present invention will be apparent from the following detailed description taken in connection with the accompanying drawings.

SUMMARY OF THE INVENTION

The present invention provides a seal for indicating whether a clockspring has been tampered with. To this end, in an embodiment, the clockspring consists of a housing, a hub rotatably mounted to the housing, and a ribbon cable connected to the housing and the hub. The seal is attached to the clockspring housing and hub. The seal may consist of a tamper indicating non-marking label stock having a facestock, flexographically printed indicia located on the facestock, and an adhesive coated over the flexographically printed indicia. The flexographically printed indicia may provide a message such as the word "VOID." Furthermore, the seal may include printed instructions for inspecting the seal.

In yet another embodiment, the seal comprises of a facestock having a top side and a bottom side, flexographically printed indicia located on the bottom side, an adhesive coated over the flexographically printed indicia for attaching the seal to the clockspring. The flexographically printed indicia may form a message, such as the word "VOID," to indicate whether the clockspring has been tampered with. In addition, instructions may printed on the facestock for inspecting the seal.

In still yet another embodiment, the present invention provides a method comprising the steps of: (1) centering a clockspring; (2) attaching a seal to the clockspring; (3) inspecting the seal to determine whether the clockspring has been tampered with; and (4) removing the seal. The step of inspecting the seal may consist of searching for indicia on the seal. In addition, the step of removing the seal from the clockspring may consist of pulling on a tab extending from the seal. Finally, the step of inspecting the seal may further consist of reading instructions printed on the facestock of the seal.

Various means for practicing the invention and other advantages and novel features thereof will be apparent from the following detailed description of an illustrative preferred embodiment of the invention.

BRIEF DESCRIPTION OF THE DRAWINGS

There is shown in the drawings a presently preferred embodiment of the present invention, wherein like numerals in the various figures pertain to like elements, and wherein.

DETAILED DESCRIPTION OF THE PRESENTLY PREFERRED EMBODIMENTS

Figure 1:
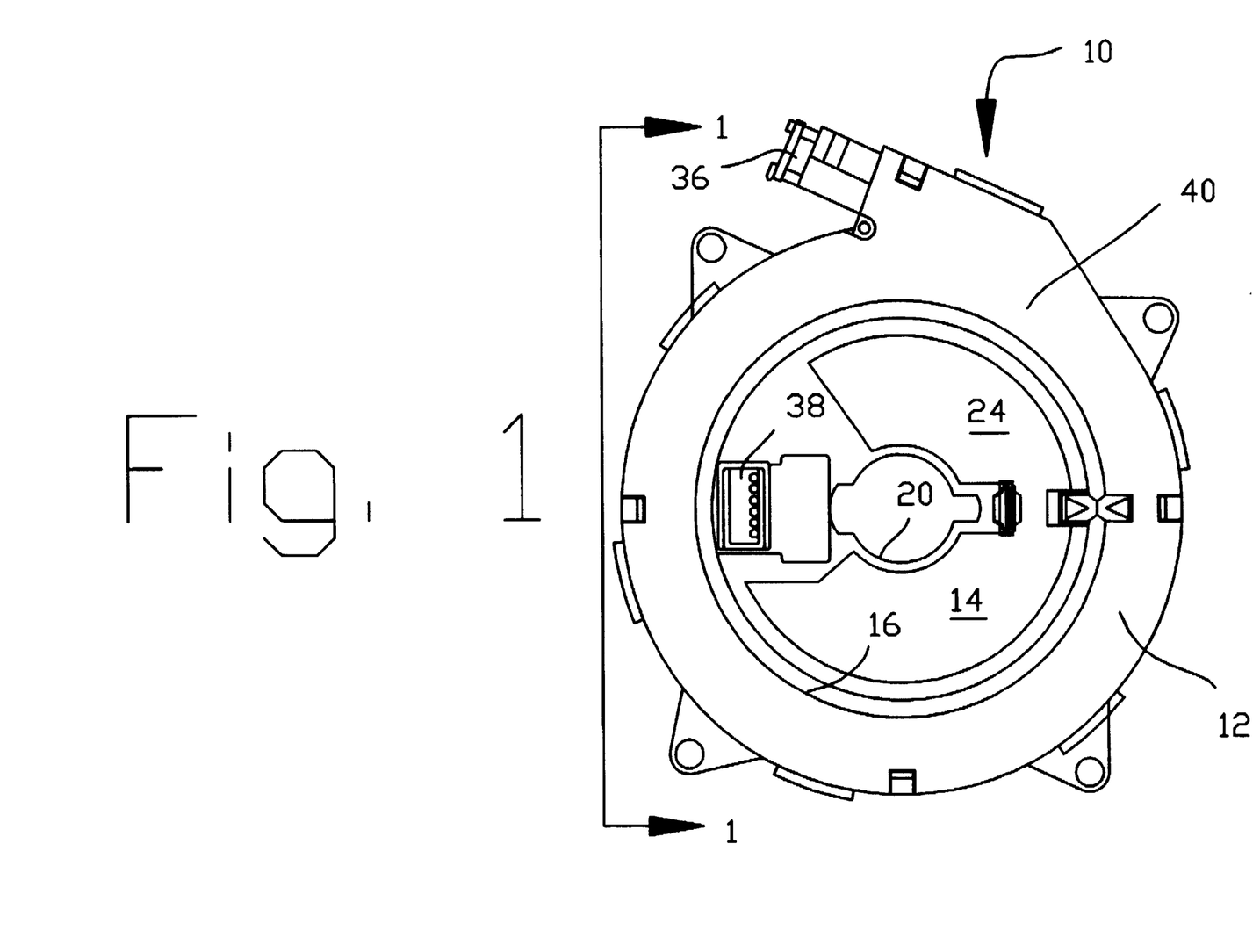
FIG. 1 is a plan view of a conventional clockspring design.
Figure 2:
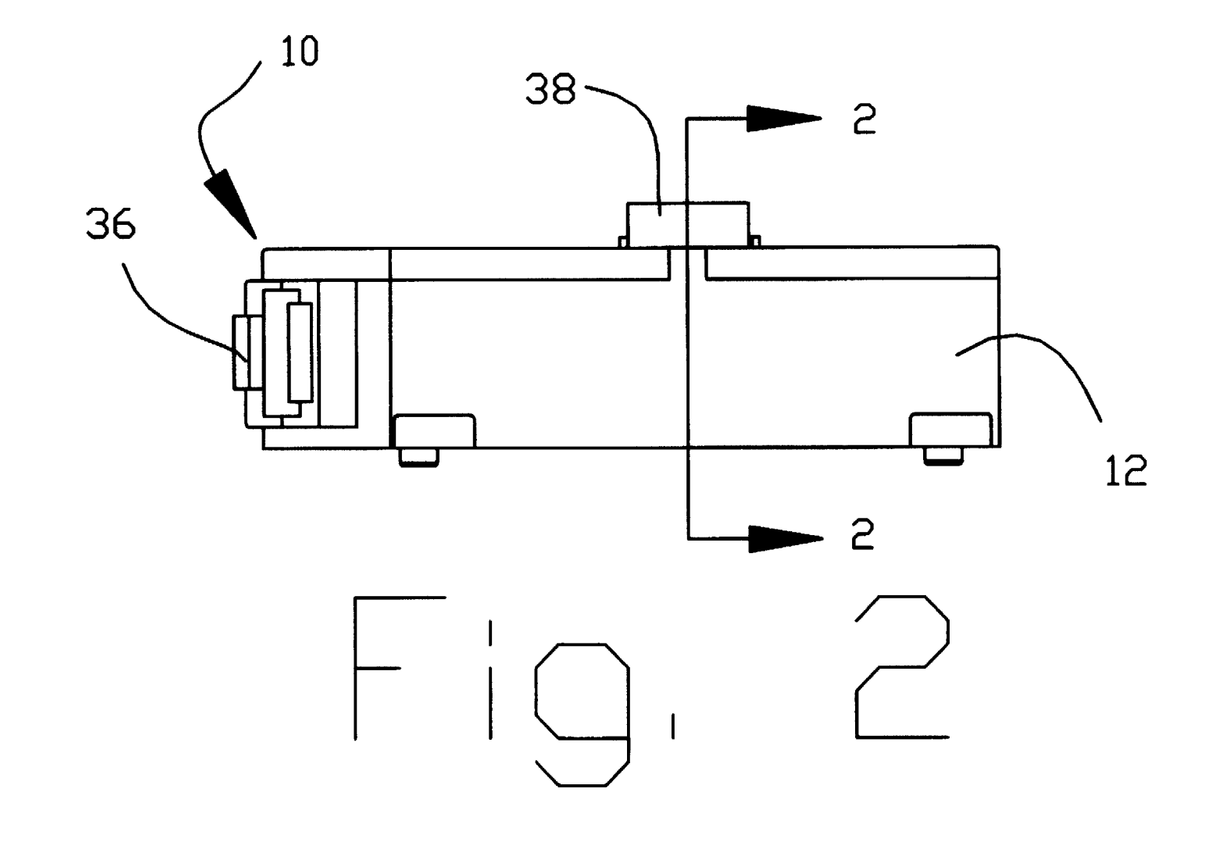
FIG. 2 is a side view of the conventional clockspring design depicted in FIG. 1, taken along line 1—1.
Figure 3:
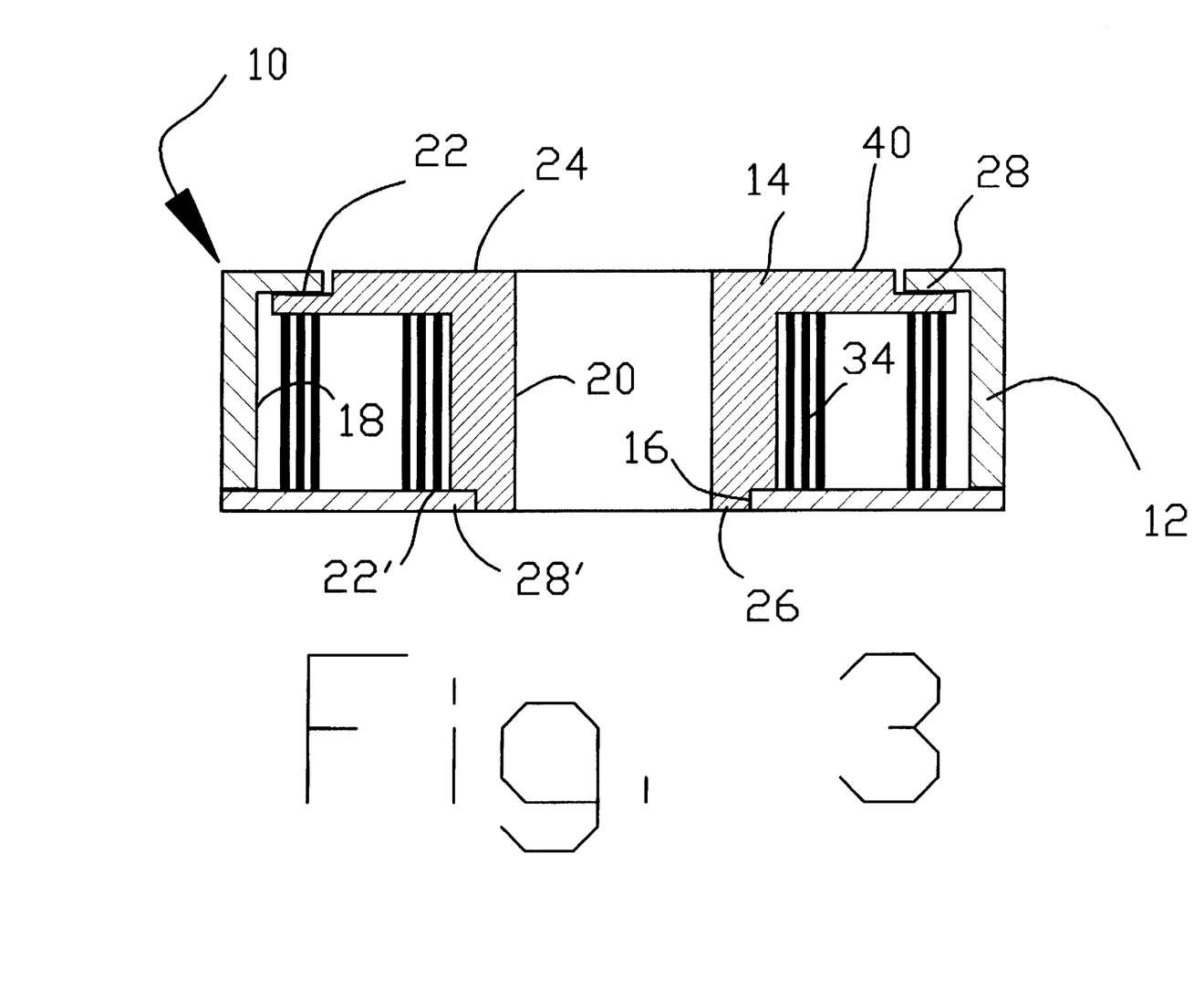
FIG. 3 is a cross-sectional view of the conventional clockspring design depicted in FIG. 2, taken along line 2—2.

Referring to the drawings, and particularly to FIGS. 1-3, a conventional clockspring 10 is depicted such as that described by U.S. Pat. No. 4,722,690 (1988), issued to Priede. The clockspring 10 comprises a housing 12 and a hub 14.

The housing 12 is generally shaped like a large donut with an aperture 16 extending through its center. In addition, the housing 12 is hollow and thus defines a circular channel 18 with an opening around the entire aperture 16.

Rotatably mounted within the aperture 16 of the housing 12 is the hub 14. The hub 14 is generally shaped like a small donut with an aperture 20 extending through its center. The hub 14 is held within the aperture 16 of the housing 12 by any conventional means. Thus, the hub 14 may be rotationally mounted to the housing 12 by having an indentation 22,22' around the entire circumference of the top 24 and the bottom 26 of the hub 14 which is overlapped by a brim 28,28' extending around the entire circumference of the top 30 and the bottom 32 of the housing 12, respectively.

Within the housing circular channel 18, and surrounding the hub 14, is a coiled ribbon cable 34. The ribbon cable 34 has a first end and a second end (ends of cable not shown). The first end of the cable 34 is conductively attached to a first connector 36 which extends out of the circular channel 18 and through the housing 12. Likewise, the second end of the ribbon cable 34 is conductively attached to a second connector 38 which protrudes through the hub 14. Correspondingly, a constant electrical connection is maintained between the first connector 36 on the housing 12 and the second connector 38 on the rotatable hub 14.

Since clocksprings are well known in the art, no further explanation is provided for describing the construction of the conventional clockspring design 10 depicted in FIGS. 1-3.

As illustrated by FIGS. 2 and 3, it is preferred that the top 24 of the hub 14 be flush with the top 30 of the housing 12 so that a relatively flat surface portion 40 exists between the top of the hub and the top of the housing.

Figure 4:
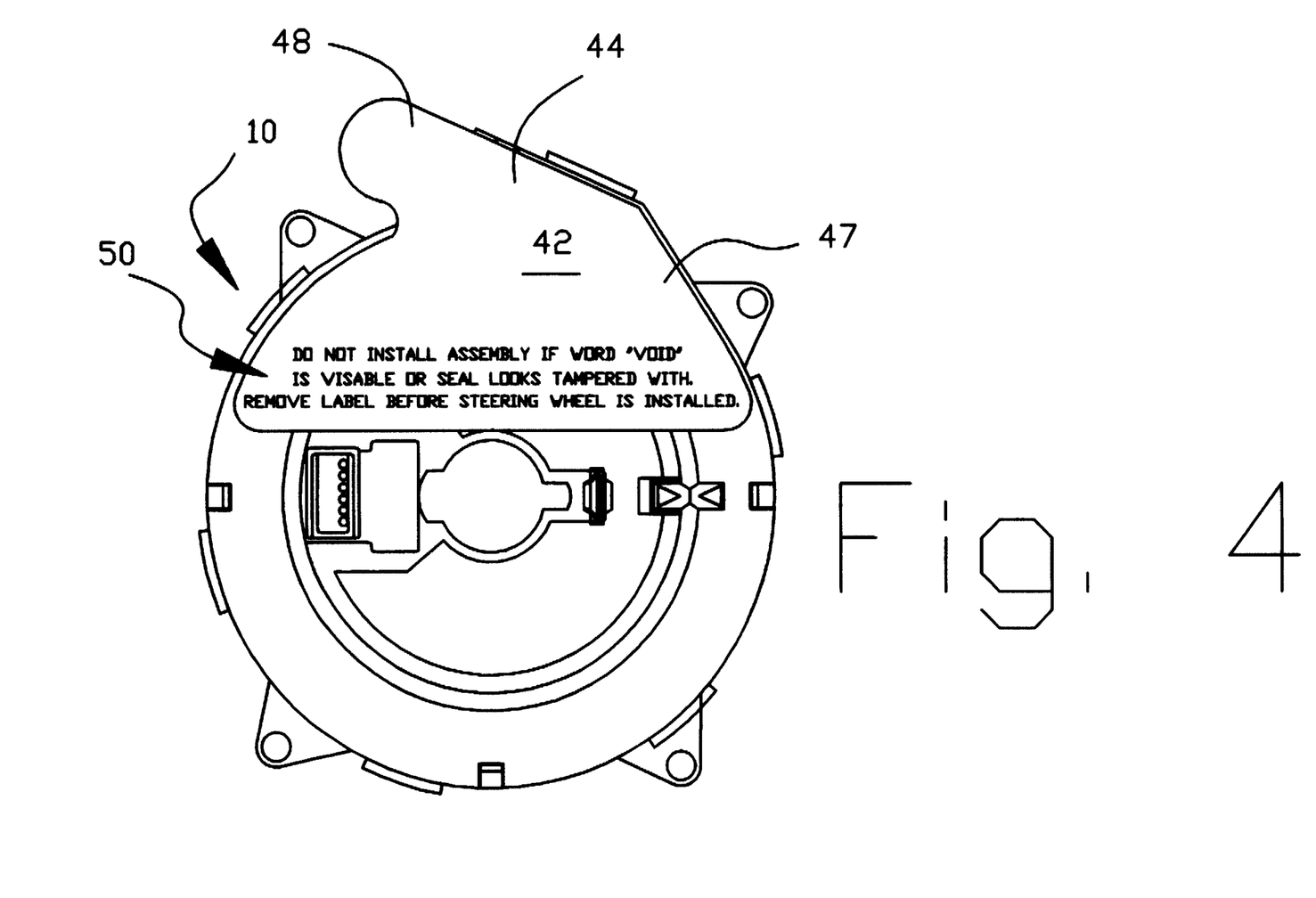
FIG. 4 is a plan view of the conventional clockspring depicted in FIG. 1 with the tamper prevention and detection seal attached thereto.
Figure 5:
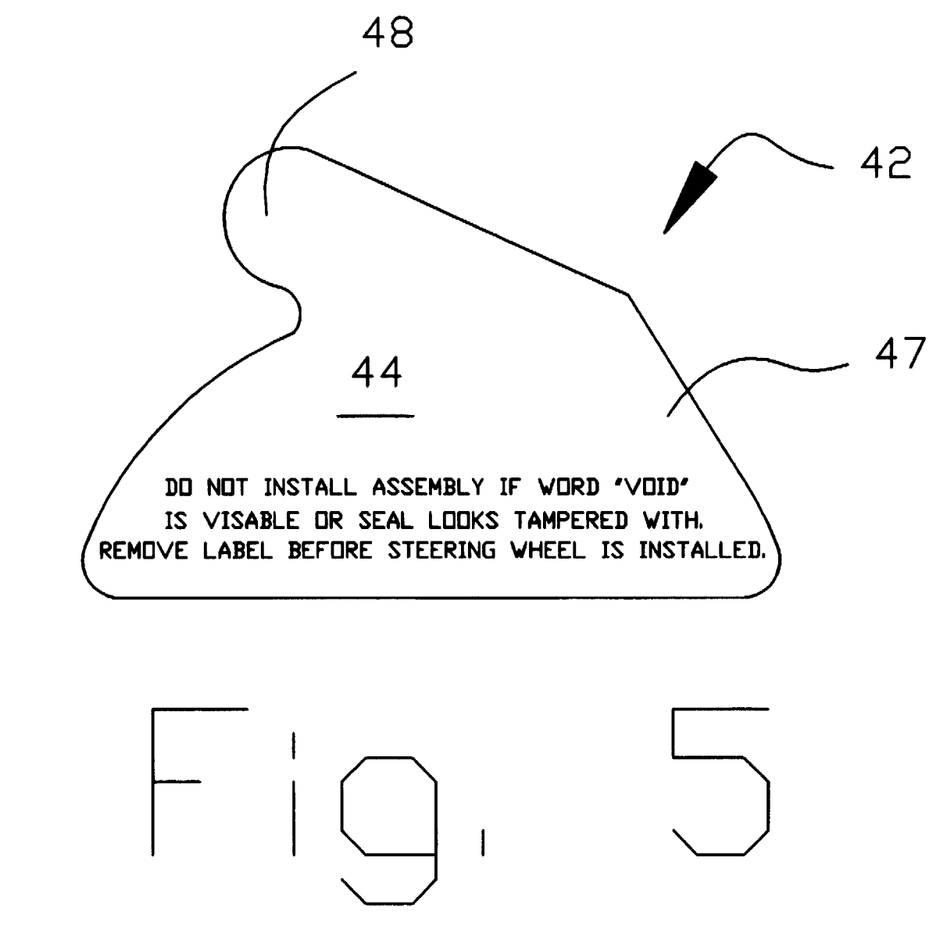
FIG. 5 is a plan view of the top side of the tamper prevention and detection seal depicted in FIG. 4 before its attachment to the clockspring of FIG. 1.
Figure 6:
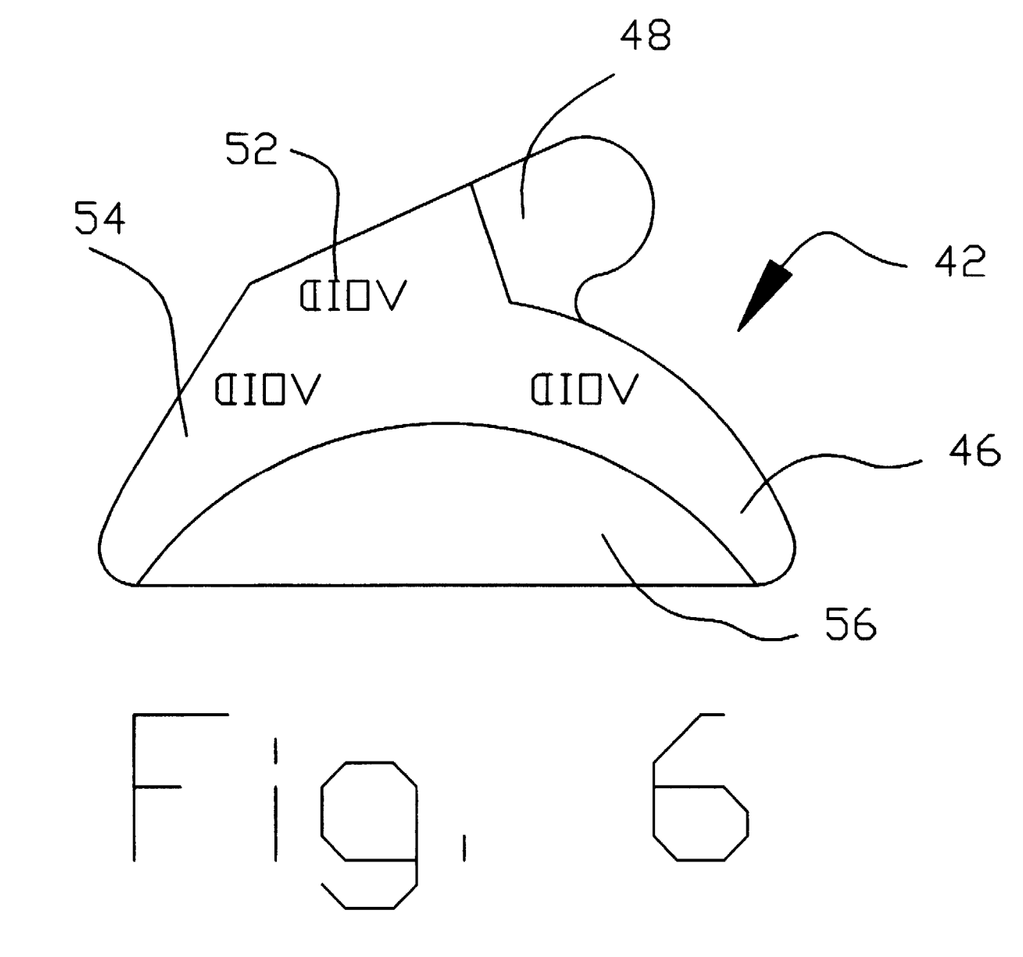
FIG. 6 is a plan view of the bottom side of the tamper prevention and detection seal depicted in FIG. 5.

Turning to FIG. 4, a plan view of the conventional clockspring 10 of FIGS. 1-3 is depicted with a tamper prevention and detection seal 42 attached thereto. FIG. 5 is a plan view of the top 44 of the tamper prevention seal 42, depicted in FIG. 4, before the seal 42 has been attached to the clockspring 10. Furthermore, FIG. 6 is a plan view of the bottom 46 of the tamper prevention seal 42 depicted in FIG. 5.

In the preferred embodiment, the seal 42 is made from a tamper-indicating non-marking label stock, Scotchmark™ product number 7394, from the Minnesota Mining and Manufacturing Company, St. Paul, Minn. The seal 42 has a silver facestock 47 made of 2.0 millimeters (i.e., 50 microns) thick polyester.

Referring back to FIG. 4, the seal 42 is generally shaped to conform with the form of the flat surface 40 on the clockspring 10. However, the seal 42 also has a tab portion 48 which overhangs from the clockspring 10.

In an embodiment, there may be instructions 50 located on the top 44 of the seal 42 for inspecting and removing the seal. The instructions 50 may indicate how to determine if the clockspring 10 has been tampered with before its installation onto a device such as the steering wheel of an automobile. In addition, the instructions 50 may state that the seal 42 must be removed before the clockspring 10 is instated onto the steering wheel. Furthermore, it is desired that the instructions 50 be clearly visible and thus they may be printed on the top 44 of the seal 42 using red colored ink.

As indicated in FIG. 5, before the seal 42 is attached to the clockspring 10, no messages are visible from the top 44 of the seal except for the instructions 50. However, as shown in FIG. 6, flexographically printed indicia are located on the bottom 46 of the seal 42 to provide a message 52 such as "VOID." More than one message 52 may be located randomly on the seal bottom 46 or in a uniform pattern. In FIG. 6, three void messages 52 are randomly located in a semicircular pattern 54 with no message being located on the tab 48 or the other area 56 not within the semicircular pattern.

Except for on the tab portion 48, a hi-integrity acrylic adhesive is coated over the seal bottom 46 including the flexographically printed indicia. It is desired that the adhesive provide a high bond to the clockspring flat surface 40 while not leaving behind an adhesive reside on the clockspring 10 whenever the seal 42 is removed therefrom. Preferably, the clockspring housing 12 and hub 14 are made from a high surface energy plastic (ABS, polycarbonate) which provides a smooth and flat surface for attachment of the seal 42. Correspondingly, it is preferred that the adhesive should have a coating thickness of 1.5 millimeters (37.5 microns) and consist of #490 hi-integrity acrylic from the Minnesota Mining and Manufacturing Company, St. Paul, Minn.

Once the clockspring 10 has been assembled and properly centered, the seal 42 is attached to the top 30 of the housing 12 and the top 24 of the hub 14. Preferably, the seal 42 is attached onto the relatively flat surface portion 40 which exists between the top 24 of the hub 14 and the top 30 of the housing 12. The adhesive on the bottom 46 of the seal 42 will provide for the immediate attachment of the seal 42 to the clockspring 10. However, it is preferred that the seal 42 be allowed a period of time to bond to the clockspring 10 such as 24 hours.

In a preferred assembly procedure, the seal 42 is attached to the hub 14 and the housing 12 following assembly of the clockspring 10 and prior to shipment of the clockspring to ensure that the clockspring may not become uncentered during transportation and prior to its attachment to a steering wheel.

Figure 7:
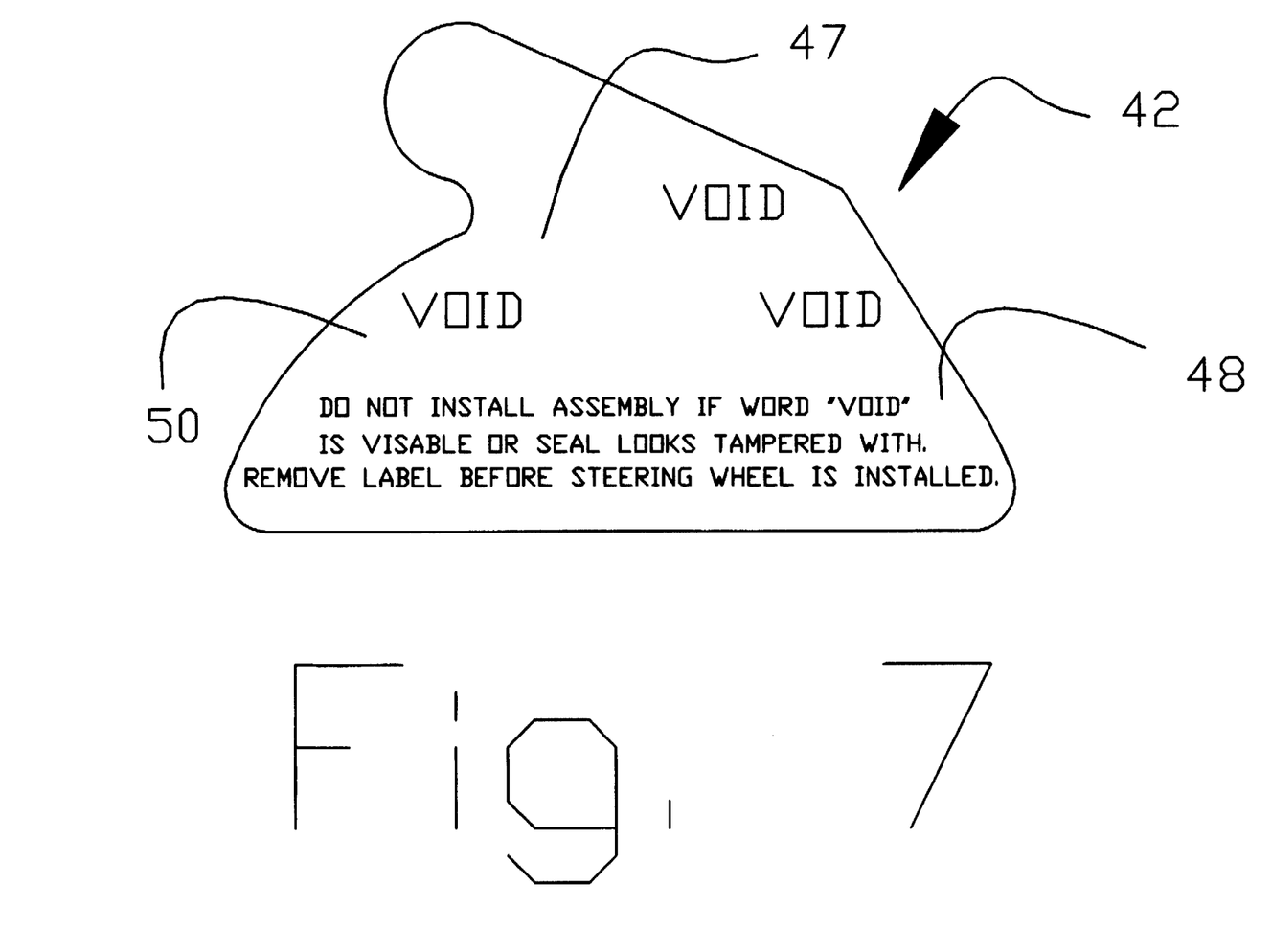
FIG. 7 is a plan view of the top side of the tamper prevention and detection seal depicted in FIG. 4 after it has been removed from the clockspring of FIG. 4.

The attachment of the seal 42 to both the hub 14 and the housing 12 will prevent the hub from rotating because of the secure bond formed on the clockspring 10 by the seal. Furthermore, as shown in FIG. 7, the seal 42 will provide a void message 52 which is visible in the facestock 47 when any removal of the seal is attempted. The void message 52 is activated in the facestock 47 by the adhesive bond formed between the clockspring 10 and the seal 42. Thus, the adhesive activates the void message 52 in the facestock 47 when the seal 42 is removed from the clockspring 10. However, as indicated previously, it is preferred that the bonding time between the seal 42 and the clockspring 10 be long enough (e.g., 24 hours) to ensure the activation of the void message 52 in the facestock 47 once removal of the seal is attempted.

Prior to removing the seal 42 and installing the clockspring 10 on a steering wheel, the seal can be inspected to determine if the seal looks tampered with and/or the void message 52 is visible in the facestock 47. The appearance of indicia such as the void message 52 or other signs of tampering will indicate that the clockspring 10 has been tampered with and thus the clockspring should be checked to ensure proper centering. Otherwise, the seal 42 can be removed and the clockspring can be immediately installed on the steering wheel since the clockspring 10 is properly centered.

The seal 42 is removed from the clockspring 10 by simply gripping the seal tab 48, which overhangs from the clockspring, and firmly pulling the seal from the clockspring. As discussed above, such removal will activate the appearance of the void message 52 in the facestock 47.

It should be understood that various changes and modifications to the presently preferred embodiments described herein will be apparent to those skilled in the art. For example, the present invention can be applied not only to clocksprings but also to any other moveable assembly such as that needs to be indexed in a desired position for assembly or any other reasons pertaining to the function of the part, i.e., steering column multi-function switch. Such changes and modifications may be made without departing from the spirit and scope of the present invention and without diminishing its attendant advantages. It is, therefore, intended that such changes and modifications be covered by the appended claims.

We claim:

1. An apparatus comprising:
    a) a clockspring comprising;
        i) a housing
        ii) a hub rotatably mounted to said housing;
        iii) a ribbon cable connected to said housing and said hub; and
    b) a seal attached to said hub and said housing for indicating whether said clockspring has been tampered with.

2. The apparatus of claim 1, wherein said seal comprises of a tamper indicating non-marking label stock.

3. The apparatus of claim 1, wherein said seal comprises of:
    a) a facestock;
    b) flexographically printed indicia located on said facestock; and
    c) an adhesive coated over said flexographically printed indicia.

4. The apparatus of claim 3, wherein said flexographically printed indicia provides a message.

5. The apparatus of claim 4, wherein said message consists of the word "VOID.".

6. The apparatus of claim 1, wherein said seal includes instructions printed on said seal for inspecting said seal.

7. A seal for indicating whether a clockspring has been tampered with, said seal comprising:
    a) a face stock having a top side and a bottom side;
    b) flexographically printed indicia located on said bottom side; and
    c) an adhesive coated over said flexographically printed indicia for attaching said seal to said moveable assembly.

8. The seal of claim 7, wherein said flexographically printed indicia form a message to indicate whether said moveable assembly has been tampered with.

9. The seal of claim 8, wherein said message consists of the word "VOID.".

10. The seal of claim 7 further comprising instructions printed on said facestock for inspecting said seal.

11. The seal of claim 7 wherein said moveable assembly comprises a housing having an aperture and a rotatable hub mounted thereto, and said seal being attached to said housing and said hub.

12. The seal of claim 11 wherein said moveable assembly is a clockspring for transferring electrical signals through an automobile steering wheel assembly.

* * * * *